(12) United States Patent
Reed et al.

(10) Patent No.: US 7,929,274 B2
(45) Date of Patent: Apr. 19, 2011

(54) CAPACITOR WITH SACRIFICIAL LEAD WIRE CONFIGURATION AND IMPROVED MANUFACTURING METHOD THEREOF

(75) Inventors: Erik Reed, Simpsonville, SC (US); David Jacobs, Greer, SC (US); Randolph S. Hahn, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 389 days.

(21) Appl. No.: 12/061,964

(22) Filed: Apr. 3, 2008

(65) Prior Publication Data
US 2009/0251847 A1 Oct. 8, 2009

(51) Int. Cl.
H01G 9/04 (2006.01)
H01G 9/145 (2006.01)
H01G 4/228 (2006.01)
H01G 9/00 (2006.01)
H01G 9/10 (2006.01)
H05K 5/03 (2006.01)

(52) U.S. Cl. .......................... 361/528; 361/540; 361/538

(58) Field of Classification Search ................. 361/528, 361/529, 523, 538, 540, 532, 533
See application file for complete search history.

(56) References Cited

U.S. PATENT DOCUMENTS

| | | | |
|---|---|---|---|
| 6,905,925 B2 | 6/2005 | Mosley | |
| 6,914,770 B1* | 7/2005 | Goldberger | 361/528 |
| 7,061,772 B2* | 6/2006 | Arai et al. | 361/783 |
| 7,116,548 B2 | 10/2006 | Satterfield, Jr. et al. | |
| 7,138,000 B2* | 11/2006 | Kuriyama | 29/25.03 |
| 7,139,163 B2* | 11/2006 | Sawano | 361/540 |
| 7,619,875 B2* | 11/2009 | Choi et al. | 361/540 |
| 2005/0237698 A1* | 10/2005 | Postage et al. | 361/533 |
| 2007/0035912 A1* | 2/2007 | Hahn et al. | 361/528 |
| 2007/0076350 A1* | 4/2007 | Watanabe et al. | 361/520 |
| 2008/0218944 A1* | 9/2008 | Kuriyama | 361/528 |
| 2009/0199378 A1* | 8/2009 | Chacko | 29/25.03 |

FOREIGN PATENT DOCUMENTS

| | | | |
|---|---|---|---|
| JP | 01152617 A | * | 6/1989 |
| JP | 2001057319 A | * | 2/2001 |
| JP | 2001102252 A | * | 4/2001 |
| JP | 2002025858 A | * | 1/2002 |

* cited by examiner

*Primary Examiner* — Eric Thomas
*Assistant Examiner* — David M Sinclair
(74) *Attorney, Agent, or Firm* — Joseph T. Guy; Nexsen Pruet, LLC

(57) ABSTRACT

The capacitor has a monolithic anode and at least one anode lead wire extending from the anode. At least one sacrificial lead wire extends from the anode. A dielectric layer is on said anode and a cathode layer is on the dielectric layer. The anode lead wire is in electrical contact with the anode and a cathode lead is in electrical contact with the cathode.

30 Claims, 4 Drawing Sheets

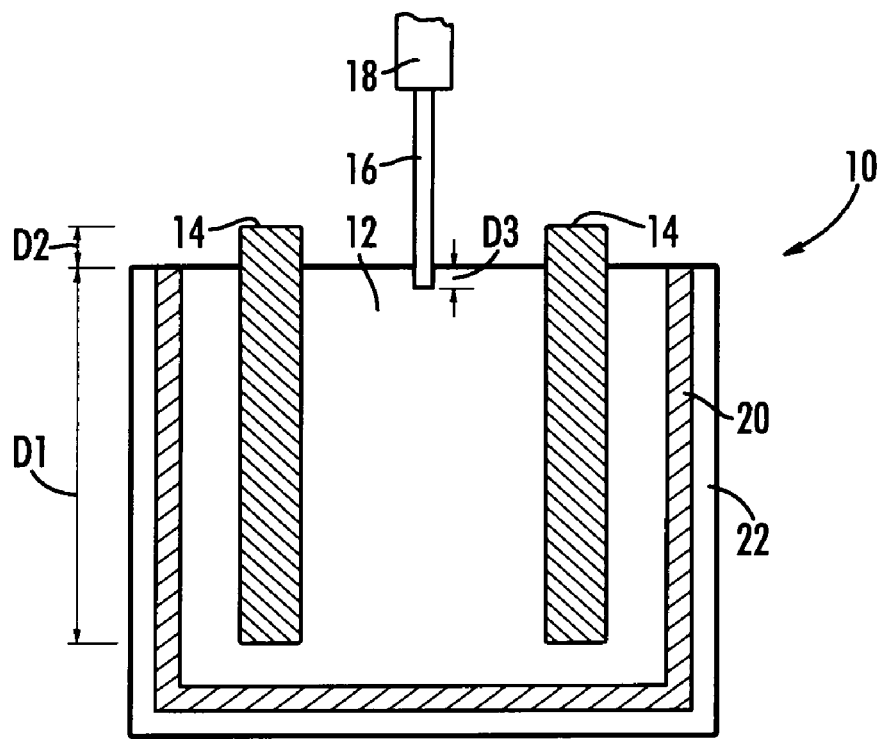
Fig.1
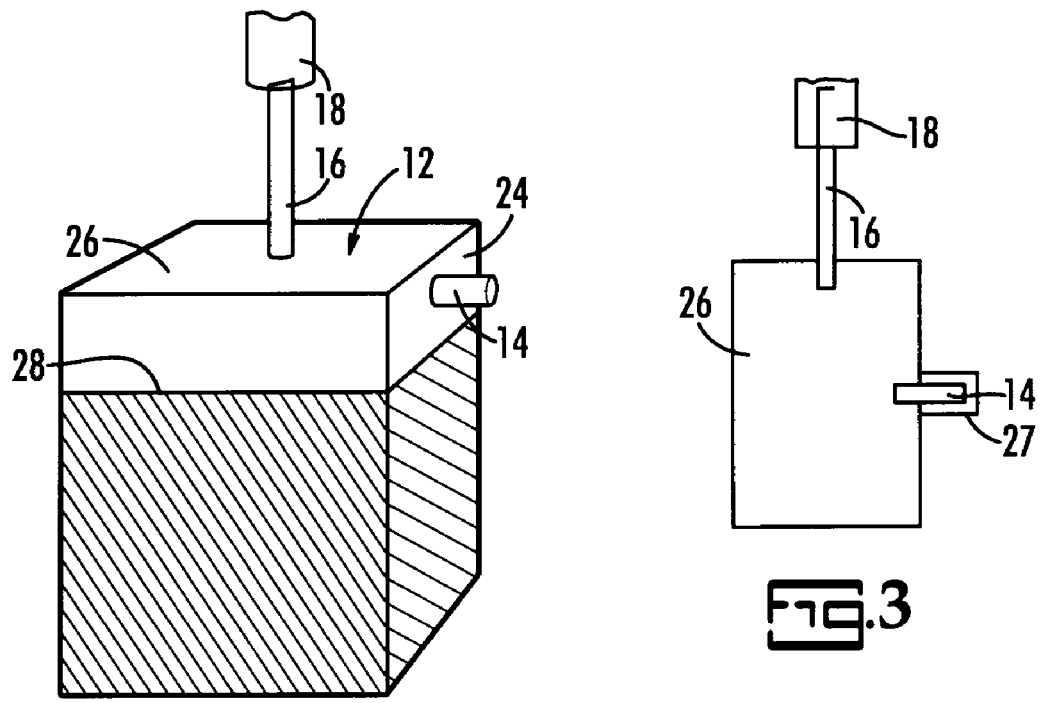
Fig.2
Fig.3

CAPACITOR WITH SACRIFICIAL LEAD WIRE CONFIGURATION AND IMPROVED MANUFACTURING METHOD THEREOF

FIELD OF THE INVENTION

The present invention is directed to an improved method for manufacturing a capacitor. More particularly, the present invention is directed to a capacitor comprising a sacrificial lead wire which allows for manufacturing efficiencies and improvements in the capacitor.

BACKGROUND OF THE INVENTION

There has been an ongoing desire for capacitors with improved characteristics. Of particular interest is a capacitor with a decrease in parasitic resistance. Various components of the capacitor have been examined, modified and improved towards this end. The present invention is primarily directed to the lead wire configuration and improvements, both specific and synergistic, related thereto.

Resistance in lead wires is generally defined by the equation for resistance which is:

Resistance=resistivity×path length/cross-sectional area.

Based on this relationship increasing the cross sectional area available for current flow reduces the resistance in the wire. This leads one of skill in the art towards as large an anode lead wire as possible with the theoretical limit being the physical size of the anode and package. Due to physical size limitations the maximum cross-sectional area for current flow through a single cylindrical lead wire is $\pi d^2/4$ wherein d is the diameter.

Increasing the lead wire diameter decreases resistance in the wire itself and between the wire an anode. Unfortunately, increasing the wire diameter also reduces the capacitance by displacing porous anode body material which would otherwise contribute to capacitance. The use of multiple lead wires reduces the path length for current to flow through the porous anode body. A porous anode body has a high resistance relative to the lead wire. Therefore, with multiple anode lead wires the path length from points in the porous body are closer to at least one anode lead wire when multiple lead wires are used. This has led to the use of multiple anode leads as described in U.S. Pat. No. 7,116,548 which is incorporated herein by reference.

In addition to the desire for decreased internal parasitic resistances there is a continual desire to decrease the cost of capacitors. There are multiple components to decreasing cost including decreasing waste material and decreasing faulty product. Multiple, or large, anode lead wires are a detriment to both aspects. The use of multiple anode wires is a significant contributor to manufacturing inefficiency and increased capacitor cost.

The electrochemical processes used to manufacture solid electrolytic capacitors typically involve multiple dipping operations. In order to minimize the variation in dip depth, as measured by percentage of the anode length, the lead wire is typically inserted parallel to the longest dimension of the anode body which is also referred to as the length of the anode. During dipping the lead wire is used as a handle for attaching the anode to manufacturing equipment. After dipping most of the lead wire is removed during the assembly process. This creates a significant amount of wasted anode wire material which is known to be a particularly expensive material. Decreasing the diameter of the lead wire decreases waste but at the expense of ESR as described above.

Yet another problem is the defects which occur as a result of cutting the lead wire. The cutting operation has been determined to be a contributor to current leakage due to the stress created at the intersection of the lead wire and anode body. Smaller diameter lead wires mitigate the leakage caused during trimming of the lead wire.

In addition to a decrease in parasitic resistances and manufacturing cost there is an ongoing desire for improved volumetric efficiency. Volumetric efficiency of a capacitor is defined as the capacitance per unit volume. One approach to maximizing volumetric efficiency is to maximize the volume of the package filled by the anode, dielectric and cathode while minimizing the space occupied by terminations and encapsulating materials. Packaging efficiency is defined as the ratio of the volume occupied by the anode, dielectric and cathode to the volume occupied by the finished capacitor which includes anode termination and cathode termination. In order to minimize the volume required for the cathode termination the termination is best made from the bottom of the capacitor as it sits on the circuit board. In order to further minimize ESL both the anode and cathode terminations should be made from the bottom of the capacitor as it sits on a circuit board. Typically, the anode wire used for handling the anode during electrochemical processing, is parallel to the circuit board which precludes mounting the capacitor with both the anode and cathode in direct contact with a substrate. Direct contact with the substrate describes a mounting technique wherein the anode lead wire, and/or cathode, are attached to a substrate directly without a lead frame there between. In this instance the anode lead wire, and/or cathode, is soldered directly to the conductive trace of the substrate.

The present invention provides a method of manufacturing a capacitor, and capacitor manufactured thereby, wherein the ESR and ESL are improved. In addition to the improved properties the capacitor can be manufactured at a reduced manufacturing cost due to a decrease in waste and a decrease in defective product. In addition, the manufacturing method allows formation of a capacitor with an increased volumetric efficiency.

SUMMARY OF THE INVENTION

It is an object of the present invention to provide a capacitor with improved electrical properties.

It is another object of the present invention to provide a method of manufacturing a capacitor with improved manufacturing efficiencies.

A particular feature of the present invention is the ability to provide a capacitor with improved volumetric efficiencies.

Another particular feature of the present invention is a decrease in the amount of waste created and a decrease in the creation of defective product.

These and other advantages, as will be realized, are provided in a capacitor. The capacitor has a monolithic anode and at least one anode lead extending from the anode. At least one sacrificial lead extends from the anode. A dielectric layer is on the anode and a cathode layer is on the dielectric layer.

Yet another embodiment is provided in a method for forming a capacitor comprising the steps of:
pressing a powder into a monolith comprising at least one anode lead wire and a sacrificial lead wire extending there from; engaging the sacrificial lead wire with a transport device; transporting the anode to a dielectric formation station wherein dielectric is formed on the pressed anode forming an anodized anode;

transporting the anodized anode to a cathode application station wherein a cathode is formed on the dielectric; and disengaging the sacrificial lead wire from the transport device.

Yet another embodiment is provided in a capacitor. The capacitor has an anode, at least one first anode lead wire extending from the anode and at least one second anode lead wire extending from the anode wherein the first anode lead wire has a larger cross-sectional area than the second anode lead wire. A dielectric layer is on the anode and a cathode layer on the dielectric layer.

DESCRIPTION OF THE DRAWINGS

FIG. 1 is a cross-sectional schematic view of an embodiment of the present invention.

FIG. 2 is a perspective schematic view of another embodiment of the present invention.

FIG. 3 is a perspective schematic view of another embodiment of the present invention.

DETAILED DESCRIPTION OF THE INVENTION

Figure 4:
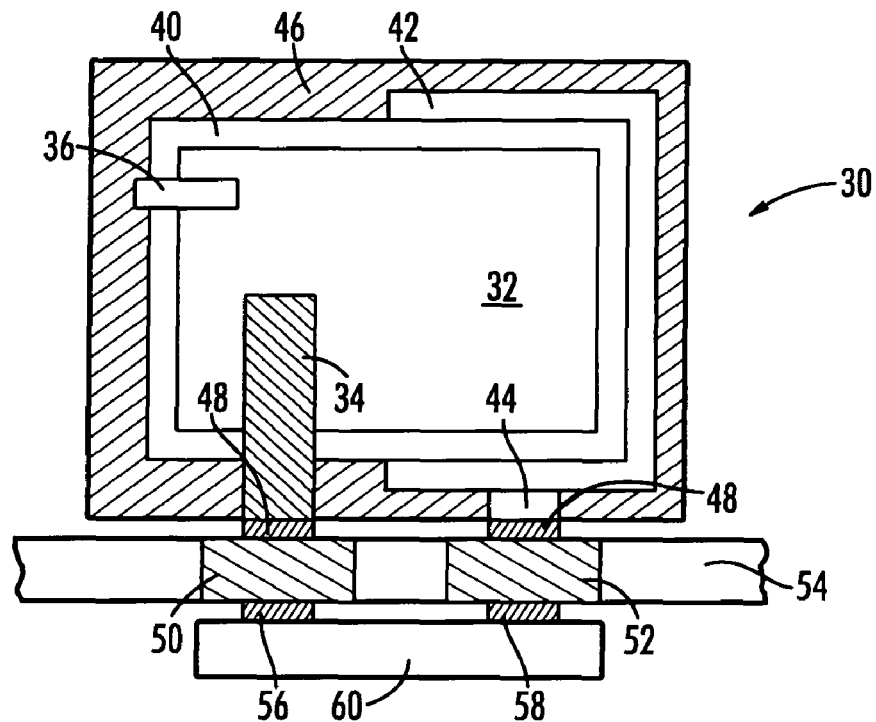
FIG. 4 is a cross-sectional schematic view of another embodiment of the present invention.

The invention will be described with reference to the drawings which form an integral part of the instant disclosure. In the various figures similar elements will be numbered accordingly.

An improved method for manufacturing a capacitor, and an improved capacitor, is provided by the instant invention.

An embodiment of the present invention is illustrated in cross-sectional schematic view in FIG. 1. In FIG. 1 the capacitor body, generally represented at 10, comprises an anode, 12. Extending from the anode is at least one anode lead wire, 14. The anode lead wire is preferably integral to the anode and extends into the anode a distance, D1. It is preferable that the distance, D1, is as long as possible to insure as much surface area contact between the anode material and the anode lead wire embedded therein. The anode lead wire extends beyond the anode body by a distance, D2, which represents a sufficient amount for attachment of the anode lead wire to a lead frame or circuit trace as will be more fully described herein.

A sacrificial lead wire, 16, extends into the anode body a distance, D3, which is as short as possible. The sacrificial lead wire is not an electrical lead in the finished capacitor and will be reduced in length in a later process step. Therefore, the sacrificial lead wire is preferably inserted into the anode an amount sufficient for mechanical strength such that the anode, and subsequent layers, can be manipulated by the sacrificial lead wire without the sacrificial lead wire becoming dislodged. It is preferred that the distance D3 be less than the distance D1. Attached to the sacrificial lead wire, 16, is a pick assembly attachment, 18. The pick assembly attachment connects the sacrificial lead wire to transport equipment wherein the anode can be manipulated through the manufacturing process. During the manufacturing process a dielectric layer, 20, is formed on the surface of the anode. A cathode layer, 22, is formed on the surface of the dielectric. It is well known in the art that an anode and cathode separated by a dielectric provides the functional characteristic known as capacitance and this combination is referred to in the art as a capacitor. In FIG. 1, the anode leads and sacrificial lead extend from a common face yet other embodiments are envisioned wherein the sacrificial lead wire is the sole extension of a face or at least one anode lead wire extends from at least one face which differs from the sacrificial lead wire.

A particular advantage of the present invention is illustrated with reference to FIG. 1. The anode lead wires, 14, can extend from the anode by a distance, indicated at D2, which is sufficient for attachment in a subsequent process without further trimming or cutting. This culminates in a reduction in material loss, eliminates a manufacturing step, and eliminates damage to the interface between the anode and anode lead wire, particularly, at the point of egress of the anode lead wire from the anode.

Yet another embodiment of the present invention is illustrated in schematic perspective view in FIG. 2. In FIG. 2, the anode, 12, has an anode lead wire, 14, extending from a first face, 24, and a sacrificial lead wire, 16, extending from a different face, 26. The second face may be adjacent to the first face, or be the opposite face. It is most preferred that the anode lead wire and sacrificial lead wire be on adjacent faces to allow the anode to be inserted up to a cathode dip line, represented as 28, in FIG. 2. It would be apparent that the cathode dip line is below the anode lead wire and then the anode lead wire does not come into contact with the cathode material. During manufacture a dielectric is formed which covers an area of the anode which is larger than that represented by the portion below the cathode dip line. The cathode is then formed on the dielectric without concern for the cathode coming into electrical contact with the anode or anode lead wires.

An alternative embodiment is illustrated in FIG. 3. In FIG. 3, the anode lead wire, 14, has a protective coating, 27 thereon. The protective coating prohibits cathode materials from coming into contact with the anode lead wire. The protective coating is not particularly limiting herein provided it provides a barrier between the anode lead wire and the cathode materials. Polymeric materials such as silicone and epoxy are mentioned as particularly suitable. After formation of the cathode layer the protective coating can be removed by an abrasive technique, laser ablation, or some other method which removes the coating while maintaining the integrity of the anode lead wire. In an alternative embodiment the anode lead wire can be electrically connected to a lead frame, or circuit connector, wherein the connection process, such as welding removes the protective coating as necessary. In another embodiment the lead may be cut thereby exposing a conductive surface, such as the end, which can be electrically connected.

An embodiment of the present invention is illustrated in schematic cross-sectional view in FIG. 4. In FIG. 4, a capacitor, 30, is mounted on a substrate, 54, and is further in electrical connection with an electronic package, 60, each of which will be further described.

The capacitor, 30, comprises an anode, 32. Extending from a face of the anode, preferably towards the substrate, 54, is an anode lead wire, 34. More preferably, that portion of the anode lead wire which extends from the anode and is substantially perpendicular to the substrate meaning the anode lead wire is at an angle of 90°±20° relative to the substrate. The anode lead wire is in electrically conductive contact with an anode connection, 50, of the substrate, 54. The anode connection may be a via, a through via, or conductive stripe integral to the substrate. A conductive adhesive, 48, such as a solder, insures conductive adhesion of the anode lead wire to the anode connection. A dielectric, 40, is on the surface of the anode and a cathode layer, 42, is on the surface of the dielectric in a sequential circumferential manner. As would be readily understood the cathode layer and anode are not in direct electrical contact since this would represent an electrical short. An optional cathode lead, 44, is attached to the cathode layer. The cathode lead is in electrical contact with a cathode connection, 52, which may be a via, through via, or conductive stripe integral to the substrate. A conductive adhesive, 48, such as a solder, insures conductive adhesion of the cathode lead to the cathode connection. The cathode layer, 42, may be directly connected to the cathode connection with a conductive adhesive. An optional, but preferred, non-conductor, 46, encases the capacitive elements. The sacrificial lead wire, 36, is preferably encased in the non-conductor and is electrically isolated and serves no electrical function in the capacitor or circuit. It is preferable that the sacrificial lead wire be trimmed to extend from the anode by as little as possible and preferably enough to be encased in non-conductor. An electronic package, 60, comprising an anode connector, 56, and cathode connector, 58, is in electrical contact with the anode connector, 50, and cathode connector, 52, respectively. The electronic package is an electronic device which utilizes the functionality of the capacitor by electrical connection therewith.

The process of forming a capacitor utilizing the present invention will be described with reference to FIG. 5. The order of process steps in FIG. 5 is not limited thereto and where the order of process steps can be altered such an alteration is considered within the bounds of the present invention.

Figure 5:
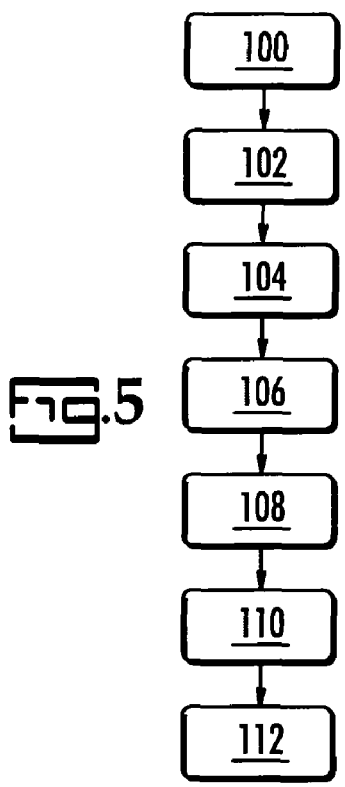
FIG. 5 is a flow-chart representation of an embodiment of the present invention.

Referring to FIG. 5, an anode pellet is prepared by pressing a powder of anode material and optionally sintering, 100. It is most preferable that the appropriate number of anode lead wires and a sacrificial lead wire are in the powder prior to pressing such that each is integral to the anode after sintering. The sacrificial lead wire is engaged, 102, by a transport device for transporting the anode through various manufacturing steps. The sacrificial lead wire is preferably engaged after pressing, however, in some manufacturing arrangements it may be advantageous to have the sacrificial lead wire engaged with at least some portion of the transport device prior to introducing the sacrificial lead wire to the anode powder. Pressing, and optional sintering, of the anode powder with lead wires integral thereto provides a leaded anode.

The leaded anode is transported to an anodizing station wherein a dielectric is formed, 104, on the exterior of the anode. Depending on the porosity of the anode the dielectric may penetrate the pores and interstitial spaces of the anode to a certain degree as well known in the art. The anodization may be accomplished by dipping the anode into an anodizing solution or by applying a dielectric to the surface. Dipping the anode into an anodizing solution while applying current to the anode through the sacrificial lead wire is the preferred method of forming the dielectric and, most preferably, the dielectric is an oxide of the anode. The leaded anode with a dielectric thereon is referred to herein as an anodized anode.

The anodized anode is transported to a cathode station wherein a cathode layer is formed, 106, on the surface of the dielectric. The cathode layer comprises a conductor preferably selected from manganese dioxide and a conductive polymer. The cathode layer may be formed by dipping the anodized anode into a solution of manganese salt, a monomer or a polymer or by applying a solution to the surface. Dipping the anode into a monomeric or polymeric solution coupled with application of an activator, if necessary, is the preferred method of forming the cathode layer. Additional cathode layer components may be added such as dopants, cross-linkers, activators and the like. The cathode layer may include additional layers provided to improve adhesion between the conductive layer and eventual external terminations or connections. The additional layers may include carbon adhesive layers, conductive metal layers and the like. The anodized anode with a cathode layer thereon is referred to herein as a capacitive envelope.

The capacitive envelope is prepared for mounting to electrical circuitry by formation of terminations to the anode lead and cathode layer and, optionally, by forming a non-conductive layer on the capacitive envelope. If the capacitor is to be directly mounted to a substrate, as illustrated in FIG. 4, formation of a cathode terminal is optional. The capacitive envelope can be mounted directly with no further preparation. If desired, the remaining terminations and non-conductive coatings are done prior to use of the capacitor.

The sacrificial lead wire is preferably separated from the transport device, 108. This can be done prior to, or after, formation of terminations and non-conductive coatings.

The sacrificial lead wire is preferably reduced in size, 110, by trimming or cutting to insure that it does not inadvertently come into electrical contact with any unintended electrical component within, or beyond, the capacitor. The sacrificial lead wire is preferably within the bounds of the non-conductive coating. The sacrificial lead wire can be separated from the transport device prior to trimming or the trimming of the sacrificial lead wire can occur with a portion still attached to the transport device and the remaining portion removed after separation from the capacitor.

The capacitor is attached to a lead frame or substrate, 112, either prior to, or after, the size of the sacrificial lead wire is diminished.

Figure 6:
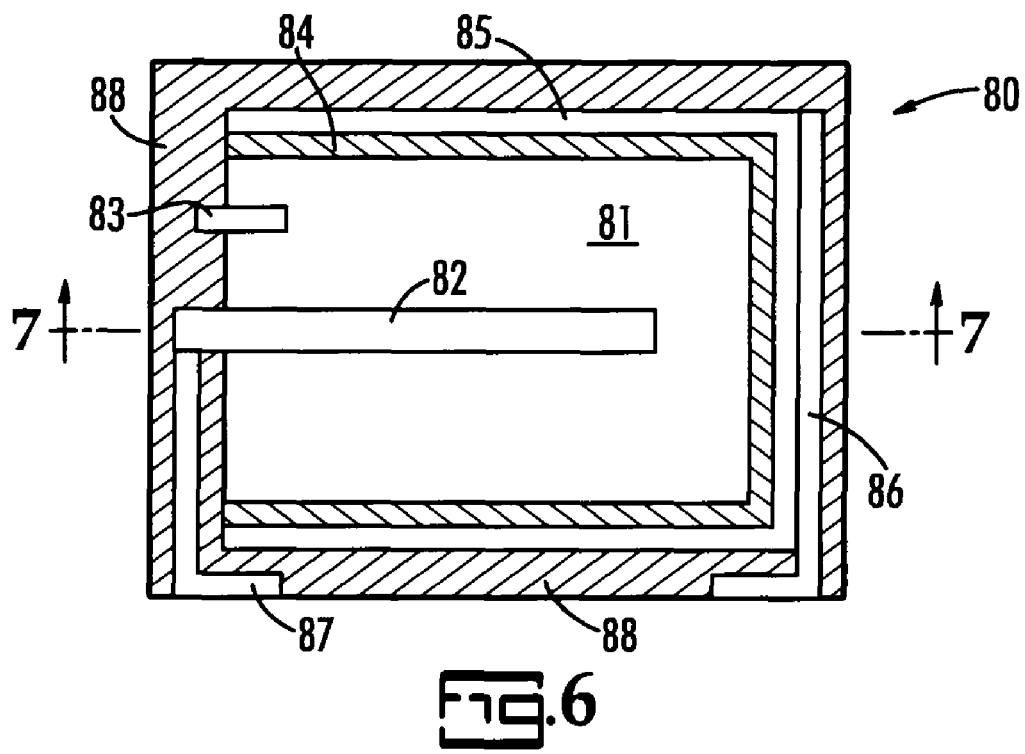
FIG. 6 is a cross-sectional schematic view of another embodiment of the present invention.
Figure 7:
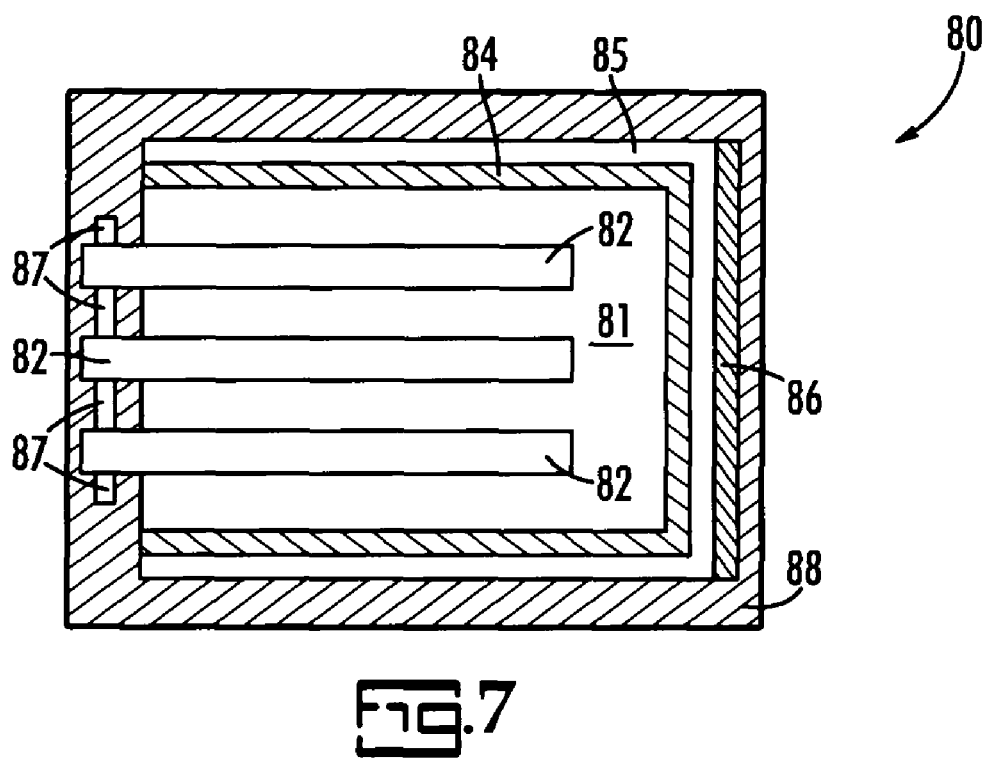
FIG. 7 is a cross-sectional schematic view of the embodiment of FIG. 6 taken along line 7-7 in FIG. 6.

An embodiment of the present invention is illustrated in cross-sectional schematic view in FIG. 6 and in cross-sectional schematic view in FIG. 7 taken alone line 7-7 in FIG. 6. A capacitor is generally represented at 80. The capacitor comprises an anode, 81. Extending from the anode is a multiplicity of anode lead wires, 82, which are in electrical contact with an anode lead frame, 87. The anode lead frame forms the electrical contact for attaching the capacitor to a substrate. A sacrificial lead wire, 83, extends slightly beyond the anode and dielectric but preferably within the boundaries defined by the non-conductive protective layer, 88. A dielectric layer, 84, is on the surface of the anode and a cathode layer, 85, is on the surface of the dielectric layer. A cathode lead, 86, is in electrical contact with the cathode layer. The cathode lead forms the electrical contact for attaching the capacitor to a substrate.

The anode lead wire cross-sectional area is preferably large to provide low ESR as discussed above. The cross-sectional area of the sacrificial lead wire is preferably large enough to provide sufficient mechanical strength for manipulating the anode through the manufacturing process but any larger area is unnecessary and creates wasted material. Furthermore, as the size of the sacrificial lead wire increases the total amount of anode material in a given volume decreases which is detrimental to capacitance. It is preferable that the cross-sectional area of the anode lead wires is larger than the cross-sectional area of the sacrificial lead wire.

Figure 8:
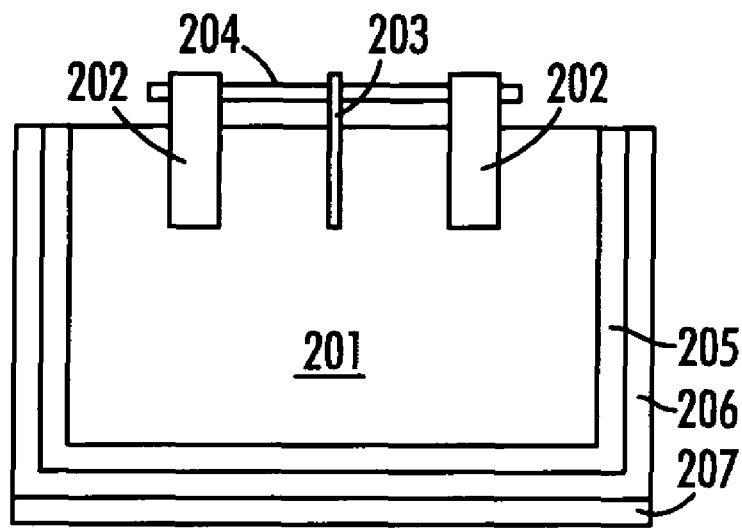
FIG. 8 is a cross-sectional schematic view of an embodiment of the present invention.
Figure 9:
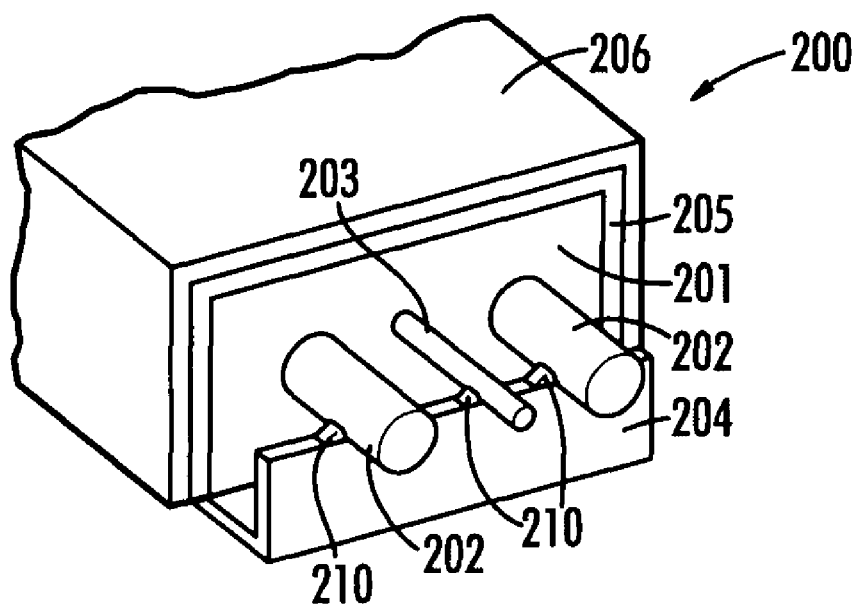
FIG. 9 is a perspective partial view of the anode portion of the embodiment of FIG. 8.

A particularly preferred embodiment is illustrated in FIGS. 8 and 9. The capacitive envelope, 200, comprises an anode, 201, with at least one large diameter anode lead wire, 202, extending there from and a small diameter anode lead wire, 203, extending there from. The small diameter lead wire is equivalent to a sacrificial lead wire in that it is the lead wire attached to the transport mechanism. The large diameter lead wire has a cross-sectional area which is at least 33% larger than the small diameter anode lead wire. A dielectric, 205 and cathode layer, 206, are provided as described herein and a cathode termination, 207, is in electrical contact with the cathode layer. The anode termination, 204, is in electrical contact with the smaller diameter anode lead wire and optionally also with the larger diameter anode lead wire, 203, as best seen in FIG. 9. The anode lead wires are preferably attached to the anode lead by welds, 210. In one embodiment it is preferable that the small diameter anode lead wire be offset slightly relative to the center of the large diameter anode lead wire such that the portion closest to the anode lead is close to the same plane. This avoids bending the small diameter or providing a lead frame with a contour.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta is most preferred. Conductive polymeric materials may be employed as an anode material. Particularly preferred conductive polymers include polypyrrole, polyaniline and polythiophene.

The cathode is a conductor preferably comprising at least one of manganese dioxide and a conductive polymeric material. Particularly preferred conductive polymers include intrinsically conductive polymers most preferably selected from polypyrrole, polyaniline and polythiophene. Metals can be employed as a cathode material with valve metals being less preferred. The cathode may include multiple layers wherein adhesion layers are employed to improved adhesion between the conductor and the termination. Particularly preferred adhesion layers include carbon, silver, copper, or another conductive material in a binder.

The dielectric is a non-conductive layer which is not particularly limited herein. The dielectric may be a metal oxide or a ceramic material. A particularly preferred dielectric is the oxide of a metal anode due to the simplicity of formation and ease of use.

The anode lead wire is chosen to have low resistivity and to be compatible with the anode material. The anode lead wire may be the same as the anode material or a conductive oxide thereof. Particularly preferred anode lead wires include Ta, Nb and NbO. The sacrificial lead wire may comprise the same material as the anode lead wire. When electrolyte formation of a dielectric is desired the sacrificial lead wire is preferably highly conductive with low electrical resistivity. The shape of the anode lead wire and sacrificial lead wire is not particularly limiting. Preferred shapes include round, oval, rectangular and combinations thereof. The shape of the anode lead wire is chosen for optimum electrical properties of the ultimate capacitor whereas the shape of the sacrificial lead wire is selected for strength when moving the anode.

The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The cathode is preferably formed by dipping, coating or spraying either a conductor or a conductive precursor. Conductive precursors are materials which form a conductor after heating or activation.

With reference to the method of manufacture the various components are transported from one station to another. Without limit thereto, transporting refers to the relative movement of the part to the manufacturing component wherein either the part or the manufacturing component may be mobile with the other being in a fixed position or components may be selectively activated thereby forming a manufacturing environment in a common location. For example, various components may be applied by a spray technique wherein neither the part nor the manufacturing component is relocated, however, the functionality of the manufacturing component is altered to perform a different function thereby simulating transport into a manufacturing environment.

The present invention has been described with particular reference to the preferred embodiments without limit thereto. One of skill in the art would readily realize additional embodiments which are not specifically set forth in the specification but which are within the scope of the claims appended hereto.

The invention claimed is:

1. A capacitor comprising:
   an anode;
   at least one anode lead wire extending from said anode;
   an anode connection in electrical contact with said anode lead;
   at least one sacrificial lead wire extending from said anode wherein said sacrificial lead wire is not attached to said anode connection;
   a dielectric layer on said anode;
   a cathode layer on said dielectric layer; and
   a cathode connection in electrical contact with said cathode layer; and
   wherein said sacrificial lead wire and at least one anode lead wire extend from a common face.

2. The capacitor of claim 1 comprising multiple anode lead wires.

3. The capacitor of claim 1 wherein said sacrificial lead wire and at least one anode lead wire extend from adjacent faces.

4. The capacitor of claim 1 wherein said anode comprises at least one material selected from mixtures, alloys or conductive oxides of Al, W, Ta, Nb, Ti, Zr and Hf.

5. The capacitor of claim 4 wherein said anode comprises at least one material selected from the group consisting of Al, Ta, Nb and NbO.

6. The capacitor of claim 1 wherein said anode lead wire extends into said anode further than said sacrificial lead wire.

7. The capacitor of claim 1 wherein said anode lead wire has a larger cross-sectional area than said sacrificial lead wire.

8. The capacitor of claim 1 wherein a portion of said sacrificial lead wire which extends from said anode is encased in a non-conductor.

9. An electronic assembly comprising:
   a substrate comprising an anode connector and a cathode connector;
   a capacitor mounted to said substrate wherein said capacitor comprises:
      an anode;
      at least one anode lead wire extending from said anode;
      an anode connection in electrical contact with said anode lead;
      at least one sacrificial lead wire extending from said anode wherein said sacrificial lead wire is not attached to said anode connection and wherein at least one said sacrificial lead wire and at least one said anode lead wire extend from a common face;
      a dielectric layer on said anode;

a cathode layer on said dielectric layer;
an anode lead in electrical contact with said anode lead wire;
a cathode layer on said dielectric layer; and
a cathode connection in electrical contact with said cathode layer;
wherein said anode lead is in electrical contact with said anode connector and said cathode lead is in electrical contact with said cathode connector.

10. The electronic assembly of claim 9 wherein at least one anode lead wire extends towards said substrate.

11. The electronic assembly of claim 9 comprising multiple anode lead wires.

12. The electronic assembly of claim 9 wherein said sacrificial lead wire and at least one anode lead wire extend from different faces.

13. The electronic assembly of claim 9 wherein said substrate comprises a via and said anode lead wire is received by said via.

14. The electronic assembly of claim 13 wherein said substrate comprises a conductor.

15. The electronic assembly of claim 9 further comprising an electronic package in electrical contact with said capacitor.

16. The electrical assembly of claim 9 wherein a portion of said sacrificial lead wire which extends from said anode is encased in a non-conductor.

17. A capacitor comprising:
an anode;
at least one first anode lead wire extending from said anode;
an anode connection in electrical contact with said first anode lead wire;
at least one second anode lead wire extending from said anode wherein said first anode lead wire has a larger cross-sectional area than said second anode lead wire and wherein said second anode lead wire is not attached to said anode connection;
a dielectric layer on said anode;
a cathode layer on said dielectric layer; and
a cathode connection in electrical contact with said cathode layer and wherein at least one said first lead wire and at least one said second anode lead wire extend from a common face.

18. The capacitor of claim 17 wherein said first anode lead wire has a cross-sectional area which is at least 33% larger than that of said second anode lead wire.

19. The capacitor of claim 17 wherein said first anode lead wire is in electrical contact with an anode termination.

20. The capacitor of claim 17 wherein said second anode lead wire is in electrical contact with an anode termination.

21. The capacitor of claim 17 wherein said first anode lead wire and said second anode lead wire are in electrical contact with an anode termination.

22. The capacitor of claim 17 comprising multiple first anode lead wires.

23. The capacitor of claim 17 wherein said second anode lead wire and at least one said first anode lead wire extends from different faces.

24. The capacitor of claim 23 wherein said second anode lead wire and at least one said first anode lead wire extends from adjacent faces.

25. The capacitor of claim 17 wherein said anode comprises at least one material selected from mixtures, alloys or conductive oxides of Al, W, Ta, Nb, Ti, Zr and Hf.

26. The capacitor of claim 25 wherein said anode comprises at least one material selected from the group consisting of Al, Ta, Nb and NbO.

27. The capacitor of claim 17 wherein said first anode lead wire extends into said anode further than said second anode lead wire.

28. The capacitor of claim 17 wherein said cathode layer comprises a polymer.

29. An electronic assembly comprising a capacitor of claim 17.

30. The capacitor of claim 17 wherein a portion of said second lead wire which extends from said anode is encased in a non-conductor.

* * * * *